United States Patent [19]
Chen

[11] Patent Number: 5,365,159
[45] Date of Patent: Nov. 15, 1994

[54] BATTERY-CHARGER WITH ADJUSTABLE CONTACTS

[75] Inventor: Stephen Chen, Changhua, Taiwan, Prov. of China

[73] Assignee: E Lead Electronic Co., Ltd., Changhua, Taiwan, Prov. of China

[21] Appl. No.: 131,752

[22] Filed: Oct. 5, 1993

[51] Int. Cl.⁵ .................... H01M 10/46; H02J 7/00
[52] U.S. Cl. ........................................ 320/15; 320/2
[58] Field of Search ...................... 320/2, 5, 6, 14, 15

[56] References Cited

U.S. PATENT DOCUMENTS

| | | | |
|---|---|---|---|
| 3,579,075 | 5/1971 | Floyd | 320/2 |
| 4,303,876 | 12/1981 | Kelly, III et al. | 320/2 |
| 4,558,270 | 12/1985 | Liautaud et al. | 320/2 |
| 4,873,479 | 10/1989 | Iimura et al. | 320/2 |
| 5,057,761 | 10/1991 | Felegyhazi, Sr. | 320/2 |
| 5,148,094 | 9/1992 | Parks et al. | 320/2 |
| 5,162,719 | 11/1992 | Tomura et al. | 320/2 |
| 5,233,281 | 8/1993 | Chiang et al. | 320/2 |
| 5,245,266 | 9/1993 | Yuen | 320/2 |
| 5,256,954 | 10/1993 | Chen | 320/2 |

*Primary Examiner*—Kristine L. Peckman
*Attorney, Agent, or Firm*—Browdy and Neimark

[57] ABSTRACT

A battery-charger with adjustable contacts which are specifically arranged according to specific positions of power contacts of different types of batteries. The battery-charger includes a base body on which a battery to be charged is placed, a contact-adjusting member disposed on the base body and a set of conductive contacts fitted in the contact-adjusting member in accordance with the positions of power contacts of the battery. After a set of contacts are specifically fitted in the contact-adjusting member, the contact-adjusting member is fitted on the base body. Thereafter, the battery to be charged is fixedly located on the base body and adjacent to the contact-adjusting member. At this time, the specifically arranged contacts contact with the power contacts of the battery and conduct electricity to the battery.

1 Claim, 2 Drawing Sheets

BATTERY-CHARGER WITH ADJUSTABLE CONTACTS

BACKGROUND OF THE INVENTION

The present invention relates to a battery-charger, and more particularly to a battery-charger with adjustable contacts which are specifically arranged according to specific positions of power contacts of different types of batteries.

The batteries currently used in portable electric implements have different positions of the positive and negative electrodes for meeting the different specifications of the electric implements manufactured by different manufacturers. Accordingly, a specific kind of electric implement will need a specific battery with corresponding contact positions. As a result, a charger for the battery must be designed with specific contact positions. Therefore, when purchasing a battery-charger, it must be considered whether the contact positions of the charger are suitable for those of the battery. This is inconvenient to a user. Furthermore, in view of a manufacturer, the market of a certain kind of electric implement is linked with the market of the battery-charger. Therefore, in case where the selling condition of the electric implement is undesirable, the selling condition of the battery-charger will be undesirable as well. Therefore, a battery-charger which has adjustable contacts and is suitable for various kinds of batteries of different electric implements is needed.

SUMMARY OF THE INVENTION

It is therefore a primary object of the present invention to provide a battery-charger with adjustable contacts which are specifically arranged according to specific positions of power contacts of different types of batteries.

The structural feature and advantages of the present invention, and the technical means adopted to achieve the present invention can be best understood through the following detailed description of the preferred embodiment and the accompanying drawings wherein:

DETAILED DESCRIPTION OF THE PREFERRED EMBODIMENT

Figure 1:
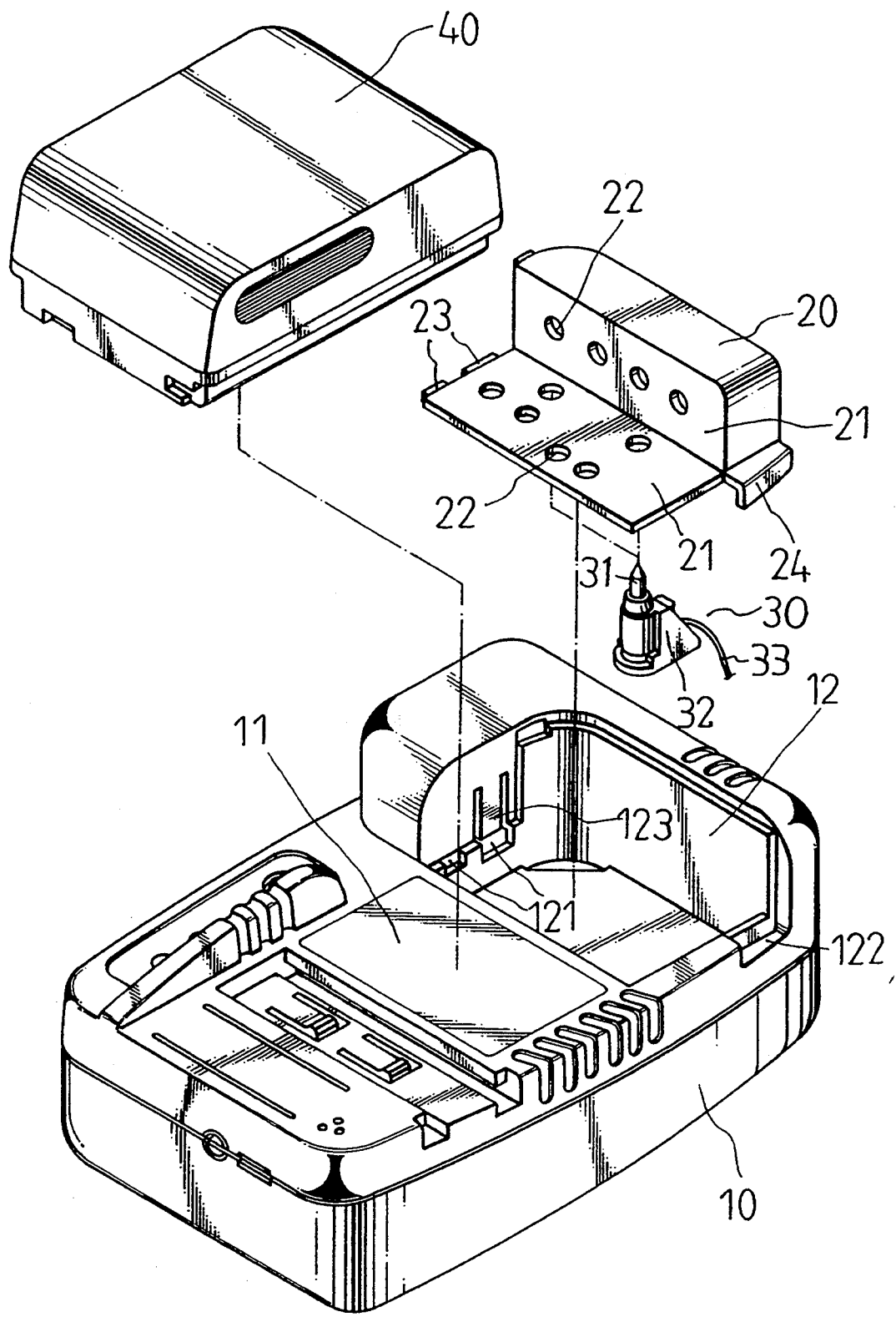
FIG. 1 is a perspective disassembled view of the present invention.

Please refer to FIG. 1. The present invention includes a base body 10, a contact-adjusting member 20 disposed on the base body 10 and a set of conductive contacts 30 adjustably fitted in the contact-adjusting member 20. The base body 10 has a battery fixing seat 11 on which a battery 40 to be charged is located and a fixing member 12 on which the contact-adjusting member 20 is installed. The fixing member 12 is formed with two lateral insert grooves 121 and 122 and a resilient fixing plate 123 for resiliently abutting against and fixing the contact-adjusting member 20 on the fixing member 12.

The contact-adjusting member 20 has two plane surfaces 21 which are perpendicular to each other and formed with several through holes 22. The set of contacts 30 are suitable to be specifically inserted in the through holes according to specific positions of power contacts of different batteries. The contact-adjusting member 20 also has two lateral insert sections 23 and 24 corresponding to the insert grooves 121 and 122 of the fixing member 12 of the base body 10, whereby the contact-adjusting member 20 is fitted on the fixing member 12 by means of inserting the insert sections 23 and 24 in the insert grooves 121 and 122.

The set of contacts 30 are used to conduct electricity supplied by an inner circuit of the base body 10 to the battery 40 for charging the same. Each of the contacts 30 is composed of a cover section 32 and a conductive contact section 31. A wire 33 is used to electrically connect the contact section 31 with the inner circuit of the base body 10.

Figure 2:
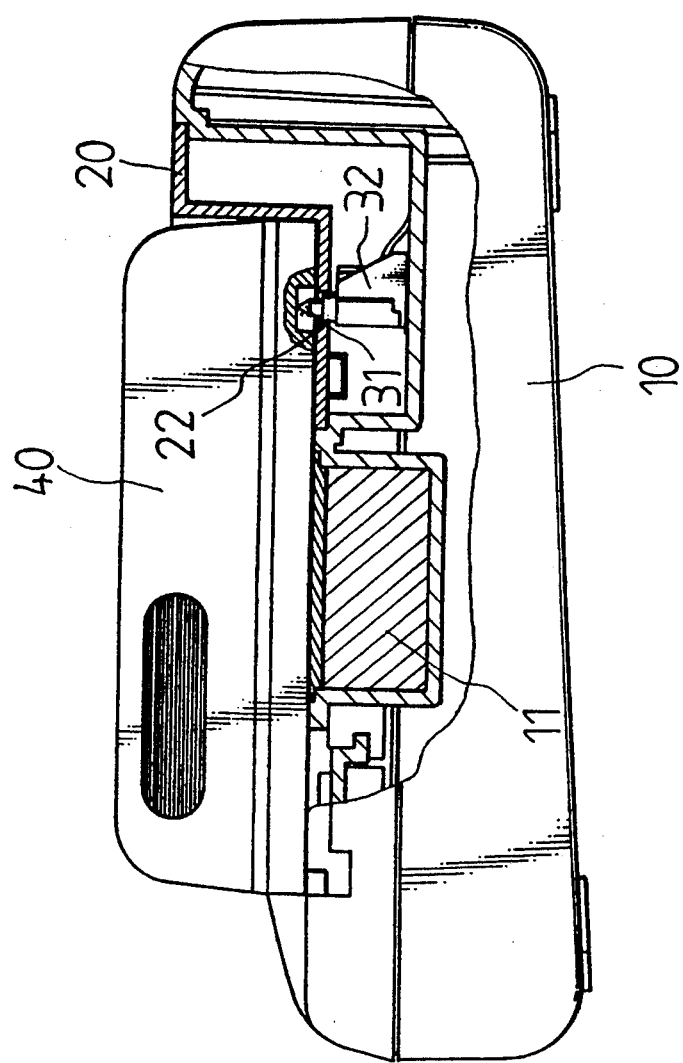
FIG. 2 is a sectional assembled view according to FIG. 1.

According to the above arrangements, as shown in FIG. 2, after the contacts 30 are inserted into the through holes 22 of the contact-adjusting member 20 in accordance with the specific positions of power contacts of the battery 40, the contact-adjusting member 20 is fitted on the fixing member 12 of the base body 10 with the insert sections 23, 24 inserted in the insert grooves 121, 122. Thereafter, the battery 40 to be charged is fixedly located on the battery fixing seat 11 of the base body 10 and closely leans against the plane surfaces 21 of the contact-adjusting member 12. At this time, the specifically arranged contacts 30 contact with the power contacts of the battery 40 and conduct electricity to the battery 40.

It can be known from the above that the present invention can be conveniently used to charge various types of batteries for different kinds of electrical implements. This is economically advantageous over the prior art.

It is to be understood that the above description and drawings are only used for illustrating one embodiment of the present invention, not intended to limit the scope of the present invention. Any variation and derivation from the above description and drawings should be included in the scope of the present invention.

What is claimed is:

1. A battery-charger for different size batteries comprising,
    a base body,
    a contact-adjusting member disposed on said base body and a set of conductive contacts moveably engaged to said contact-adjusting member,
    wherein said base body has a battery fixing seat on which said different size batteries are located and a fixing member on which said contact-adjusting member can be releasably engaged,
    said fixing member being formed with two lateral insert grooves and a resilient fixing plate for resiliently abutting against and releasably fixing said contact-adjusting member on said fixing member,
    said contact-adjusting member having two plane surfaces perpendicular to each other,
    each of said two plane surfaces formed with more than two through holes,
    said set of conductive contacts being movable for insertion into any of said through holes according to specific positions of power contacts on a battery of said different size batteries,
    said contact-adjusting member also having two lateral insert sections corresponding to said insert grooves of said fixing member of said base body,
    whereby said contact-adjusting member is engaged on said fixing member by means of inserting said insert sections in said insert grooves, said set of contacts being used to conduct electricity supplied by an inner circuit of said base body to said battery for charging the battery, each conductive contact of said set of conductive contacts being composed of a cover section and a conductive contact section, wherein said cover section is held in engagement between said contact-adjusting member and said fixing member while said conductive contact section extends through a through hole of said more than two through holes to engage a power contact of said power contacts on said battery when said contact-adjusting member is engaged to said fixing member, and a wire being used to electrically connect said conductive contact section with said inner circuit of said base body.

* * * * *